United States Patent
Hirakawa

[11] Patent Number: 5,822,132
[45] Date of Patent: Oct. 13, 1998

[54] SOFT FOCUS LENS

[75] Inventor: Jun Hirakawa, Tokyo, Japan

[73] Assignee: Asahi Kogaku Kabushiki Kaisha, Tokyo, Japan

[21] Appl. No.: 772,251

[22] Filed: Dec. 23, 1996

[30] Foreign Application Priority Data

Dec. 25, 1995 [JP] Japan ..................... 7-351074

[51] Int. Cl.$^6$ ................ G02B 15/14
[52] U.S. Cl. ............ 359/691; 359/692; 359/698; 359/707; 359/795
[58] Field of Search ............ 359/691, 692, 359/698, 707, 795

[56] References Cited

U.S. PATENT DOCUMENTS

| 4,203,653 | 5/1980 | Mori | 359/753 |
| 4,830,473 | 5/1989 | Kudo | 359/717 |
| 4,948,236 | 8/1990 | Hirano |  |
| 5,233,474 | 8/1993 | Hirakawa |  |
| 5,267,086 | 11/1993 | Hirano |  |

Primary Examiner—Frank G. Font
Assistant Examiner—Reginald A. Ratliff
Attorney, Agent, or Firm—Greenblum & Bernstein, P.L.C.

[57] ABSTRACT

A soft focus lens which is designed as a retrofocus type lens, comprises a front lens group having a negative power, a rear lens group having positive power, and a diaphragm located within the rear lens group. The front and rear lens groups are arranged in this order from an object side. In particular, the soft focus lens satisfies the following conditions;

$$SAU/f < -0.10 \quad (1)$$

$$f/fF < -0.5 \quad (2)$$

where
  SAU is spherical aberration at full open aperture, f is focal length of the whole lens system, and fF is focal length of the front lens group.

5 Claims, 12 Drawing Sheets

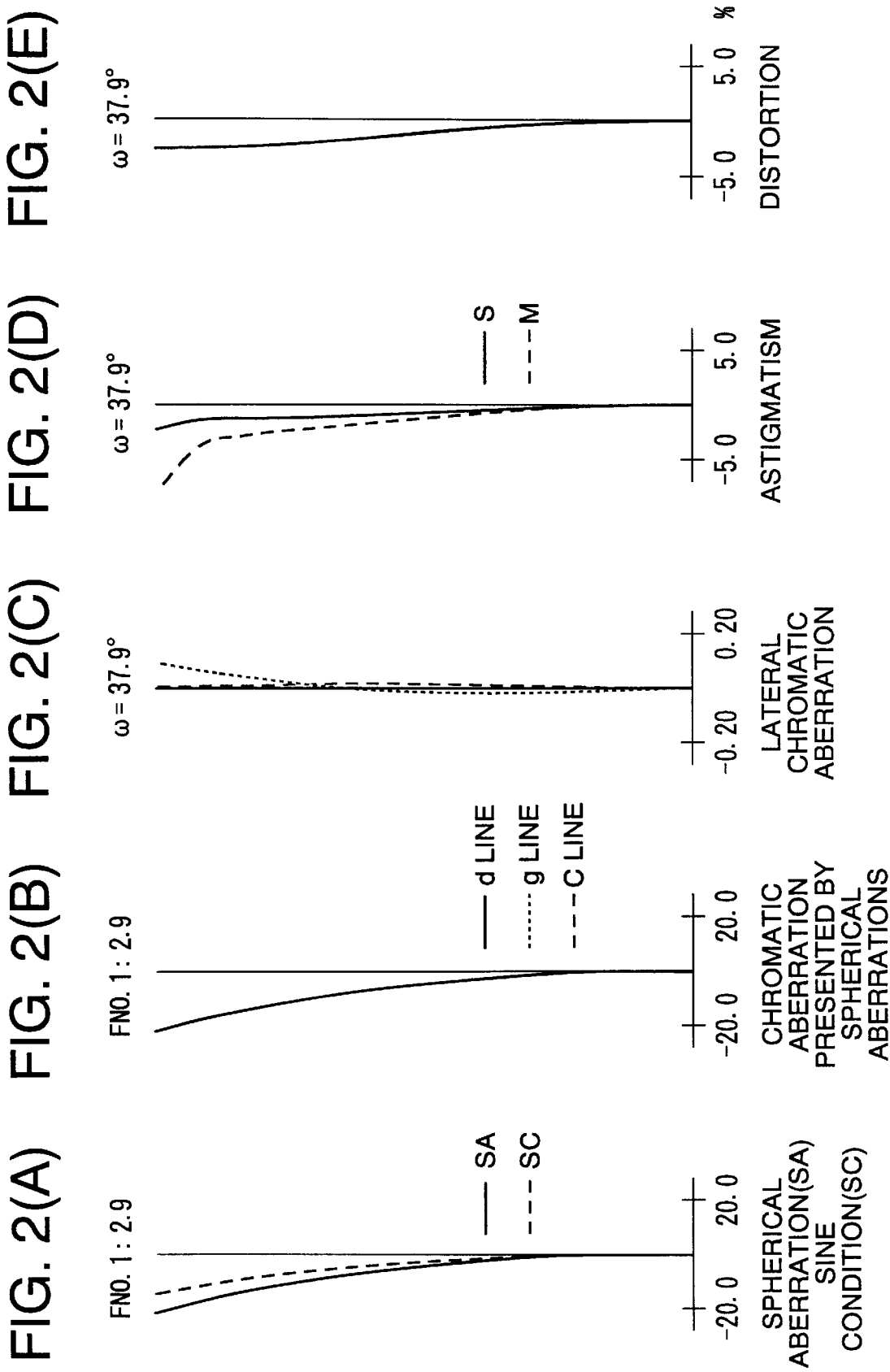

— d LINE

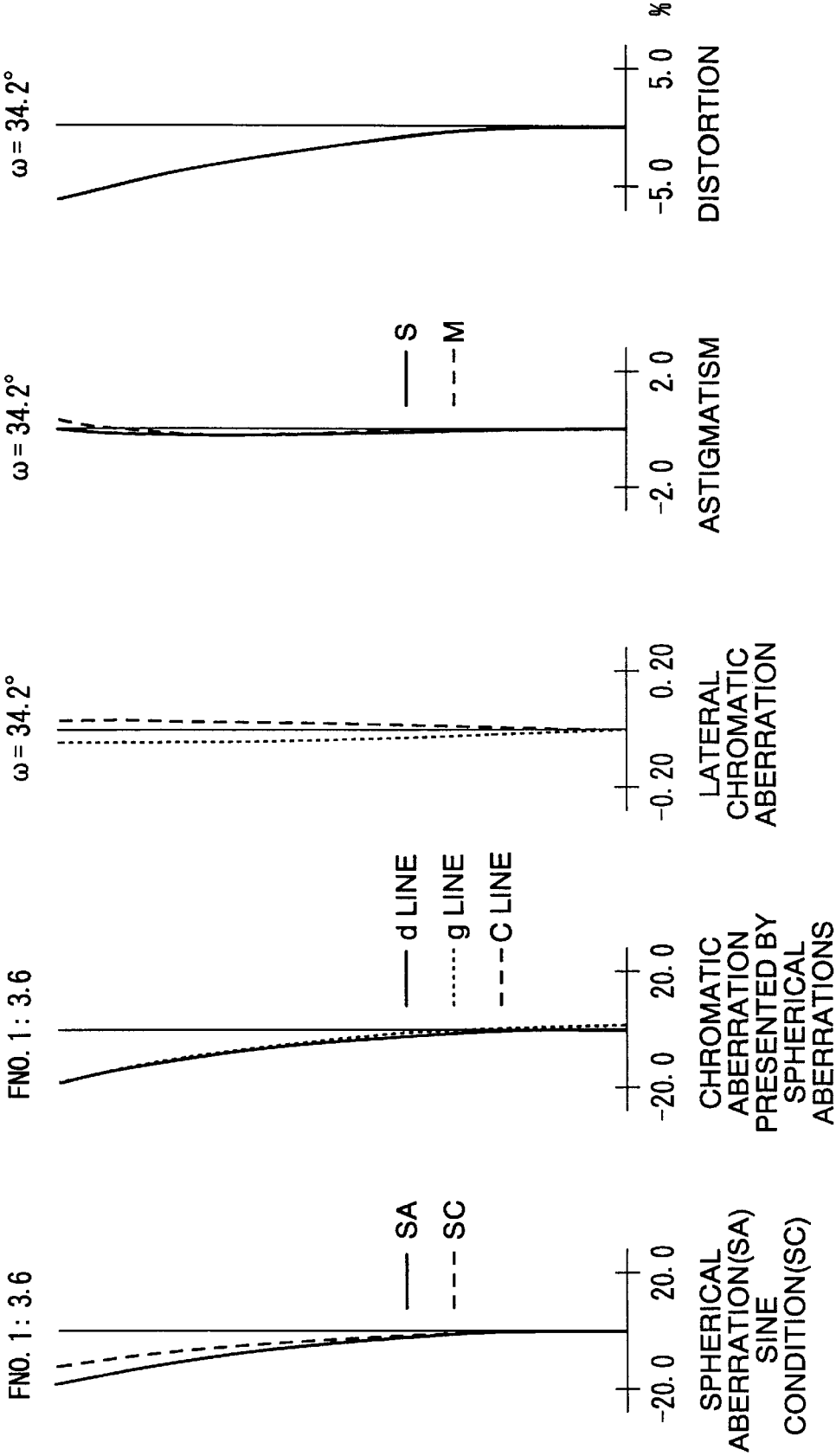

— d LINE
FIG. 9(A)    Y = 0.00
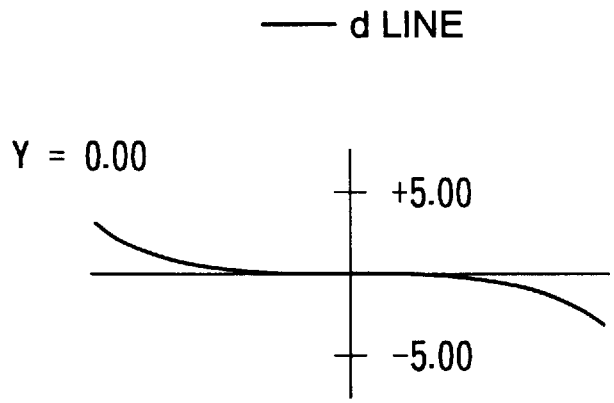
FIG. 9(B)    Y = 42.00
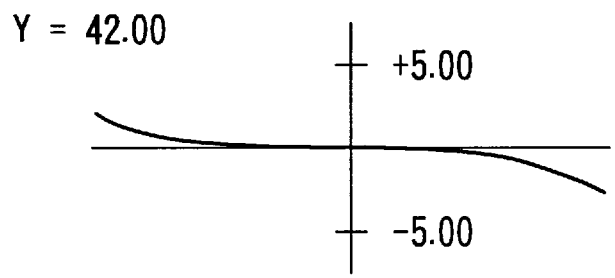
FIG. 9(C)    Y = 63.00
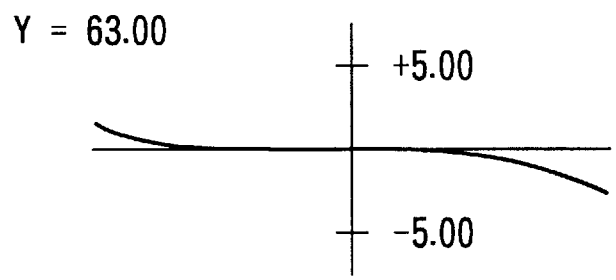
FIG. 9(D)    Y = 75.74
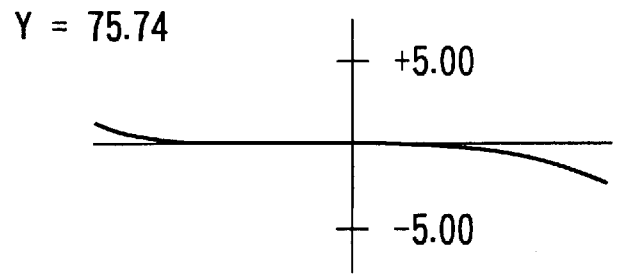

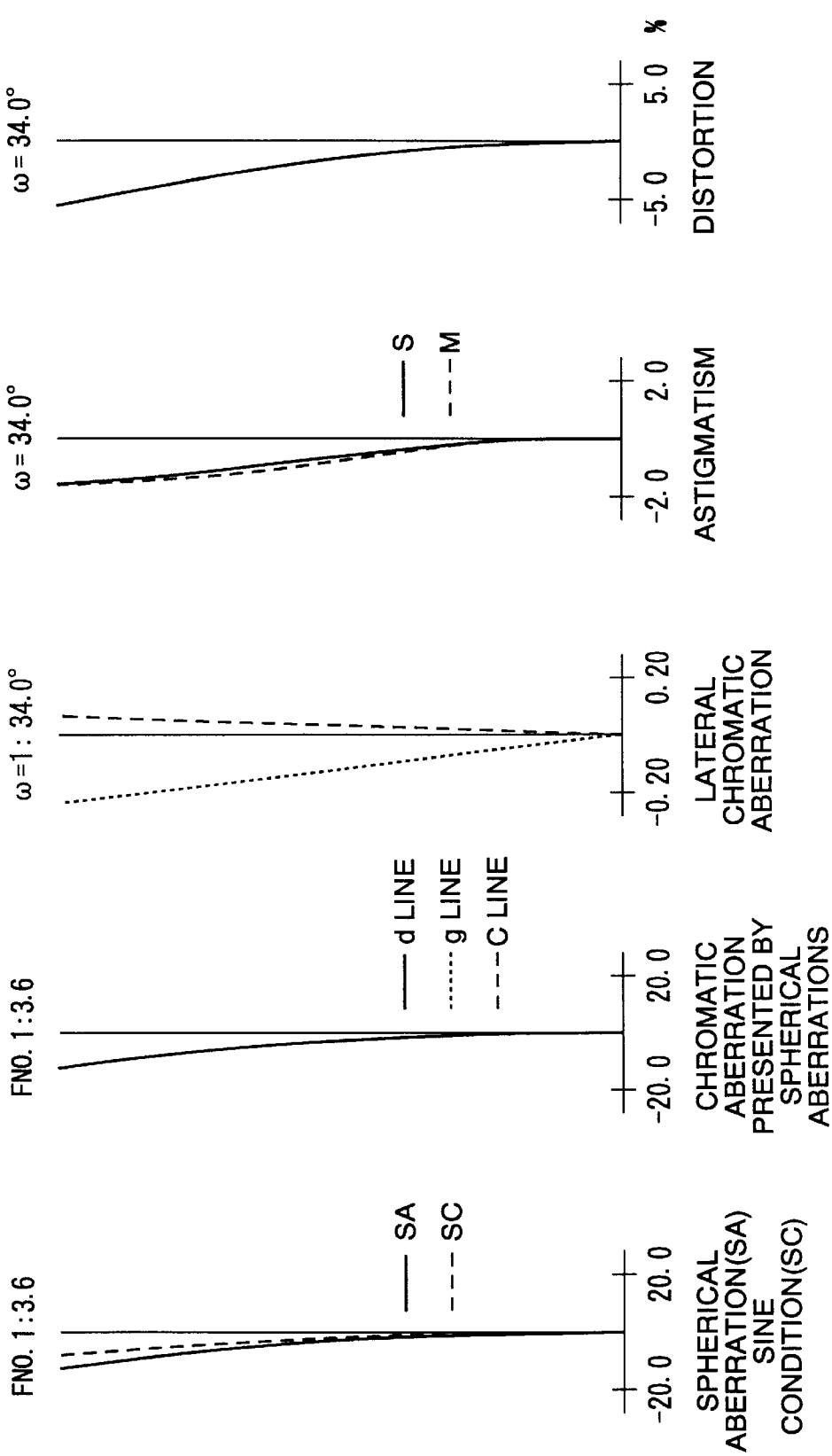

—— d LINE
FIG. 12(A)  Y = 0.00
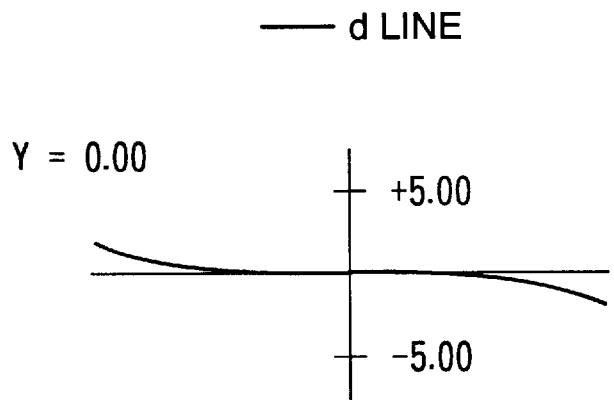
FIG. 12(B)  Y = 42.00
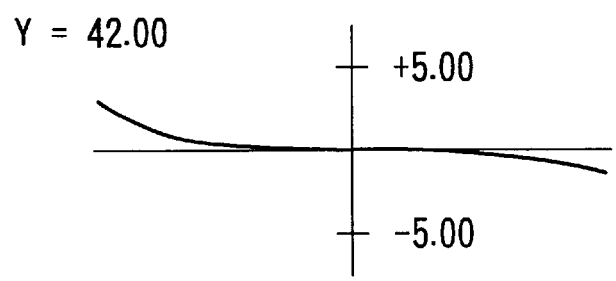
FIG. 12(C)  Y = 63.00
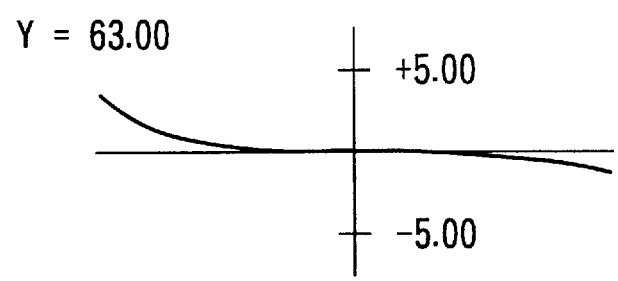
FIG. 12(D)  Y = 75.74
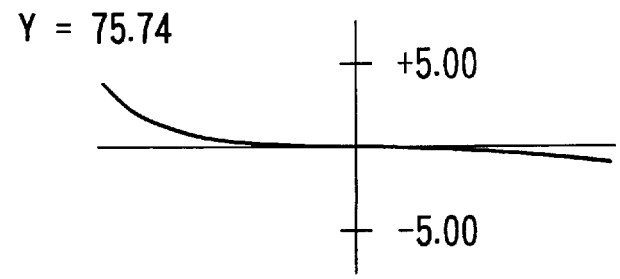

SOFT FOCUS LENS

BACKGROUND OF THE INVENTION

The present invention relates to a soft focus lens that is used as an interchangeable lens of a single lens reflex camera.

A soft focus lens is a lens that forms an image with a slightly blurred outline. A conventional soft focus lens, which is an interchangeable lens of a single lens reflex camera, has a narrow view angle, because it is generally considered that usage of the soft focus lens will be limited to portrait photography.

Since the conventional soft focus lens is not suitable to a landscape photograph due to the narrow view angle, a user who wishes to take a landscape photograph with soft focus effect must use both a soft focus filter and a normal lens.

SUMMARY OF THE INVENTION

It is therefore an object of the present invention to provide a soft focus lens that can be used for taking a landscape photograph.

According to an aspect of the soft focus lens according to the present invention, the soft focus lens is designed as a retrofocus type lens and comprises: a front lens group having a negative power; a rear lens group having positive power; and a diaphragm located within the rear lens group, wherein the front and rear lens groups are arranged in this order from an object side and wherein the soft focus lens satisfies the following conditions;

$$SAU/f < -0.10 \tag{1}$$

$$f/fF < -0.5 \tag{2}$$

where

SAU is the spherical aberration at full open aperture, f is the focal length of the whole lens system, and fF is the focal length of the front lens group.

Preferably, the value of f/fF also satisfies the following condition (3).

$$-2.0 < f/fF \tag{3}$$

In a particular case, the front lens group may include a negative meniscus lens of which a convex surface is directed to the object side.

The rear lens group includes at least one positive lens. Preferably, the positive lens may be located at the object side of the diaphragm, and a convex surface of the positive lens is directed to the object side. In this case, the following condition (4) may be satisfied;

$$0.50 < rm/f < 10.00 \tag{4}$$

where rm is a radius of curvature of a convex surface directed to the object side that has the largest positive power in the object side of the diaphragm in the rear lens group.

BRIEF DESCRIPTION OF THE DRAWINGS

FIGS. 2(A) through 2(E) are graphs showing third order aberrations of the soft focus lens according to the first embodiment.

FIGS. 8(A) through 8(E) are graphs showing third order aberrations of the soft focus lens according to the third embodiment, FIGS. 9(A) through 9(D) are graphs showing meridional transverse aberrations of the soft focus lens according to the third embodiment, FIGS. 11(A) through 11(E) are graphs showing third order aberrations of the soft focus lens according to the fourth embodiment, and FIGS. 12(A) through 12(D) are graphs showing meridional transverse aberrations of the soft focus lens according to the fourth embodiment.

DETAILED DESCRIPTION OF THE PREFERRED EMBODIMENTS

Figure 1:
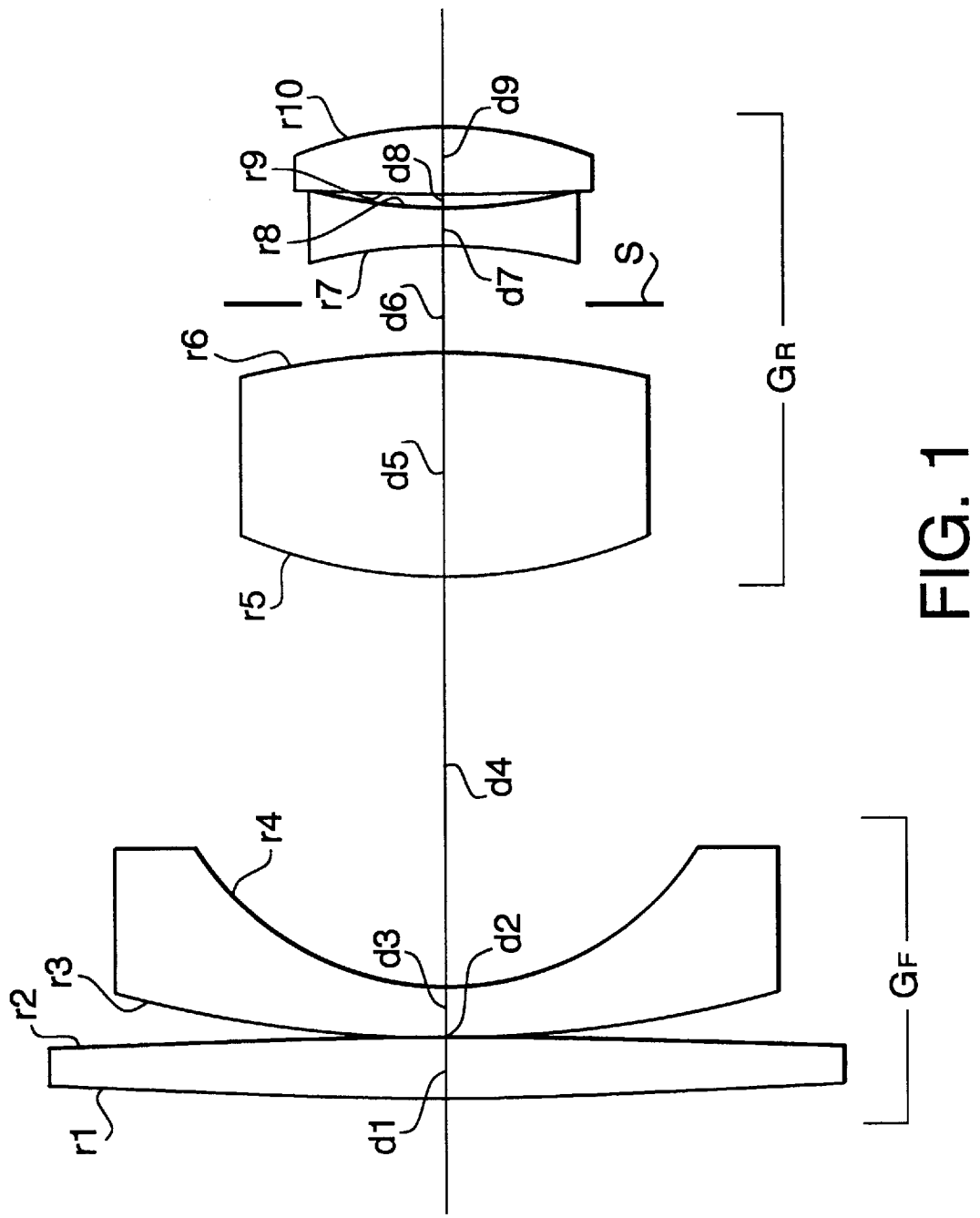
FIG. 1 is a lens diagram of a soft focus lens according to a first embodiment.
Figure 3A:
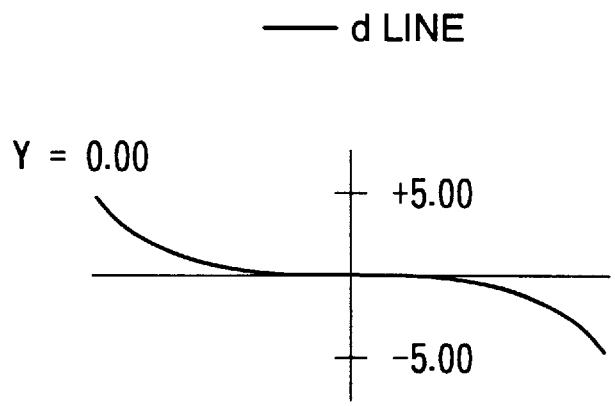
FIGS. 3(A) through 3(D) are graphs showing meridional transverse aberrations of the soft focus lens according to the first embodiment.
Figure 3B:
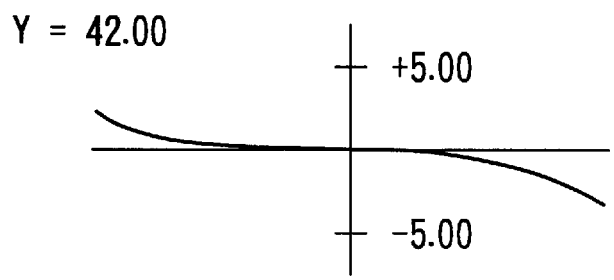
Figure 3C:
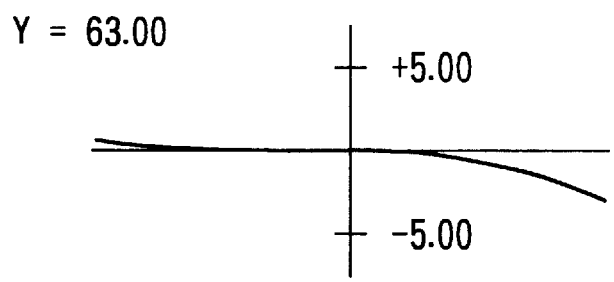
Figure 3D:
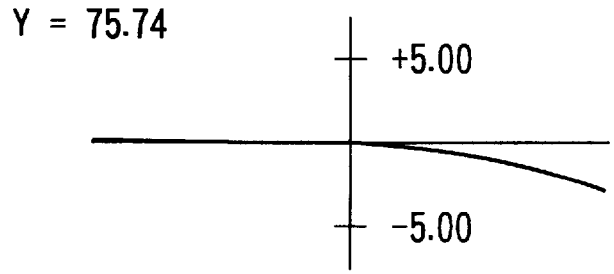

Preferred embodiments of a soft focus lens according to the present invention are described. The soft focus lens, for example as shown in FIG. 1, 4, 7 or 10, is a retrofocus type lens that comprises a negative front lens group GF; a positive rear lens group GR; and a diaphragm S positioned within the rear lens group GR. The front lens group GF and the rear lens group GR are arranged in this order from an object side. In this specification, the distance between the lenses at the boundary of the front and rear lens groups is larger than any other distances between the lenses.

The soft focus lens of the present invention satisfies the following conditions;

$$SAU/f < -0.10 \tag{1}$$

$$f/fF < -0.5 \tag{2}$$

where

SAU is the spherical aberration at full open aperture, f is the focal length of the whole lens system, and fF is the focal length of the front lens group.

The condition (1) defines the amount of spherical aberration with respect to the focal length. When the condition (1) is satisfied, positive spherical aberration remains and it causes a sufficient soft focus effect in a photograph, and a background of an object can be naturally blurred. If the value of SAU/f is larger than −0.10, the positive spherical aberration will be insufficient to obtain the preferable soft focus effect. If the value of SAU/f is large positive value, i.e., if the lens has a large negative spherical aberration, the blurred condition of the background will be unnatural.

The condition (2) defines a ratio of the focal length of the whole lens system to that of the front lens group. When the condition (2) is satisfied, the view angle is sufficiently wide to be suitable for taking a landscape photograph. If the value of f/fF is greater than −0.5, the view angle will be narrow because of insufficient negative power of the front lens group.

Preferably, the value of f/fF will satisfy the following condition (3):

$$-2.0 < f/fF \quad (3).$$

When both conditions (2) and (3) are satisfied, i.e., the value of f/fF is selected between the upper and lower limits, the negative power of the front lens group is appropriately defined such that the view angle is sufficiently wide while keeping high performance in imaging. If the value of f/fF is smaller than −2.0, since the negative power of the front lens group will be too large (too negative), field curvature will be overcorrected, i.e., an image surface will curve outward.

In a conventional soft focus lens, the performance of the lens for oblique rays is not considered because of its narrower view angle. However, in a wide view angle soft focus lens, the performance of the lens for oblique rays should be considered. In this regard, the spherical aberration must remain but any other oblique aberration should be well corrected.

Comma and astigmatism can be reduced if a negative lens of the front lens group comprises a negative meniscus lens having a convex surface directed to the object side. When the negative lens has the meniscus shape, since the centers of curvature of the lens surfaces of the negative lens may be on the side of the diaphragm of the negative lens, in particular the negative lens is a concentric with respect to the diaphragm when the centers coincide with the center of the diaphragm, the meniscus shape provides a low amount of comma and astigmatism of the negative lens.

The rear lens group includes at least one positive lens. Preferably, the positive lens may be located at the object side of the diaphragm, and a convex surface of the positive lens is directed to the object side. In this case, the following condition (4) is satisfied;

$$0.50 < rm/f < 10.00 \quad (4)$$

where rm is a radius of curvature of a convex surface directed to the object side that has the largest positive power in the object side of the diaphragm in the rear lens group.

The positive spherical aberration required for the soft focus effect is generated at a convex surface having large positive power of the positive lens. When this convex surface is located at the object side of the diaphragm in the rear lens group, the center of curvature of this convex surface is close to the position of the diaphragm on the optical axis, i.e., the convex surface may be a concentric condition with respect to the diaphragm. In this way, aberrations other than the spherical aberration can be reduced. Also, the field curvature of the whole lens system may be well corrected by the combination of this convex lens in the rear lens group with the negative lens in the front lens group.

Since the value of f/fF is related to the f-number at full open aperture and to the angle of view, the soft focus lens of the present invention can also be defined as a lens which satisfies the following conditions (1), (5) and (6);

$$SAU/f < -0.10 \quad (1)$$

$$FNO. < 4 \quad (5)$$

$$\omega > 30° \quad (6)$$

where

SAU is spherical aberration at full open aperture, f is focal length of said soft focus lens, FNO. is f-number at full open aperture, and ω is a half angle of view.

Four numerical embodiments will be described below. In the embodiments, the front lens group comprises at least a negative meniscus lens of which a convex surface is directed to the object side, and the front lens group may include a lens having low positive power at the object side of the negative meniscus lens. The rear lens group is provided with at least a positive meniscus lens of which a convex surface is directed to the object side at the object side of the diaphragm S and a negative lens and a positive lens are included in the rear lens group at the image side of the diaphragm S. The rear lens group may include an additional positive lens at the object side of the diaphragm S.

First Embodiment

FIG. 1 shows an arrangement of the soft focus lens of the first embodiment. The numerical construction of the lens of this embodiment is described in TABLE 1. In the table, f denotes a focal length of the whole lens system (mm), fB denotes a back focus (mm), fF denotes a focal length of the front lens group, FNo. denotes an F-number, ω denotes a half view angle (degrees), SAU denotes an amount of spherical aberration at full open aperture, r denotes a radius of curvature (mm), d denotes a distance between the surfaces along the optical axis (mm), n denotes a refractive index at d-line (a wavelength of 588 nm) and v denotes an Abbe number.

Surface numbers are counted from the object side (left in FIG. 1), for example, r1 and r2 represent the object side surface and the image side surface of the first lens, d1 represents a thickness of the first lens.

TABLE 1

| f = 100.00 | | fB = 127.25 | fF = −115.765 |
| FNo. = 1:2.9 | | ω = 37.9° | SAU = −22.0 |

| Surface number | r | d | n | v |
|---|---|---|---|---|
| 1 | 1351.000 | 10.43 | 1.58913 | 61.2 |
| 2 | −1509.940 | 0.35 | | |
| 3 | 225.400 | 8.34 | 1.62041 | 60.3 |
| 4 | 49.740 | 69.55 | | |
| 5 | 84.270 | 38.23 | 1.77250 | 49.6 |
| 6 | −169.980 | 18.08 | | |
| 7 | −84.600 | 6.95 | 1.78470 | 26.2 |
| 8 | 124.890 | 2.29 | | |
| 9 | 686.550 | 11.14 | 1.77250 | 49.6 |
| 10 | −64.470 | | | |

FIG. 2 shows third order aberrations of the soft focus lens according to the first embodiment. FIG. 2(A) shows a spherical aberration SA and a sine condition SC, FIG. 2(B) shows a chromatic aberration represented by spherical aberrations at d-line (588 nm), g-line (436 un) and C-line (656 nm), FIG. 2(C) shows a lateral chromatic aberration at the same wavelengths as in FIG. 2(B), FIG. 2(D) shows an astigmatism (S: Sagittal, M: Meridional) and FIG. 2(E) shows distortion. FIGS. 3(A) through 3(D) are graphs showing meridional transverse aberrations of the first embodiment at the points on an image plane where the distance Y from the optical axis equals to 0.00 mm, 42.00 mm, 63.00 mm and 75.74 mm respectively.

Second Embodiment

Figure 4:
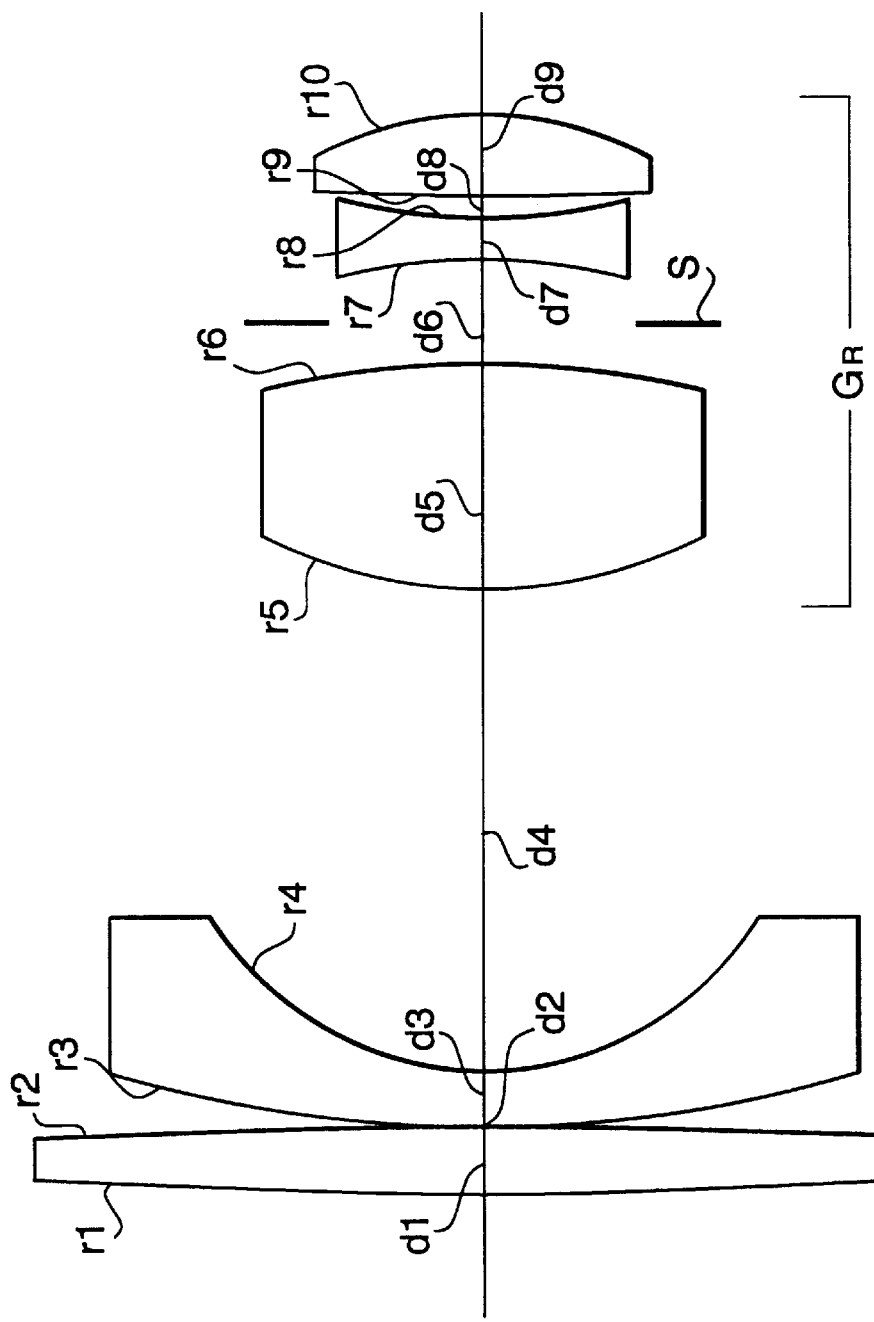
FIG. 4 is a lens diagram of a soft focus lens according to a second embodiment.
Figure 5:
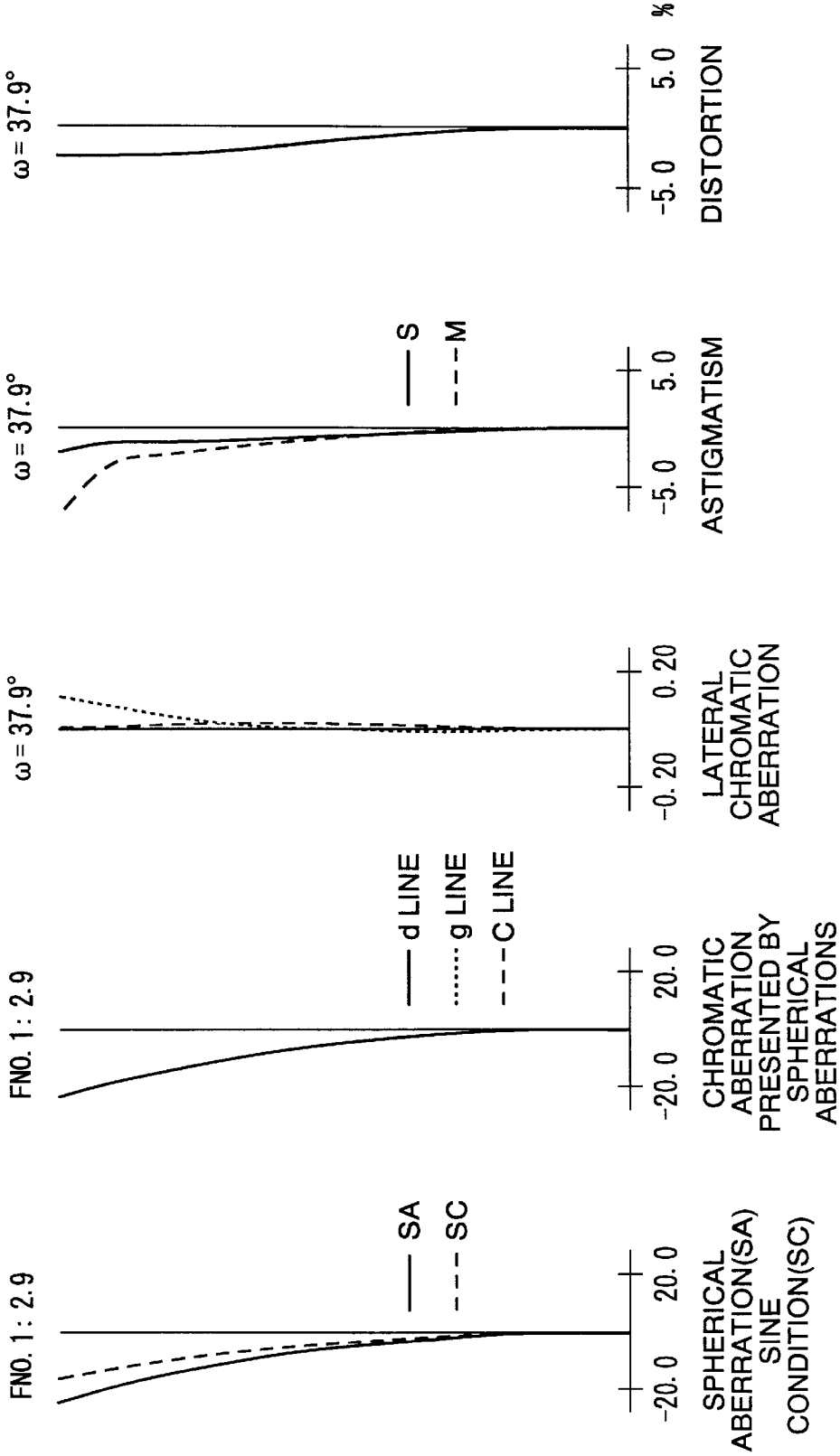
FIGS. 5(A) through 5(E) are graphs showing third order aberrations of the soft focus lens according to the second embodiment.
Figure 6:
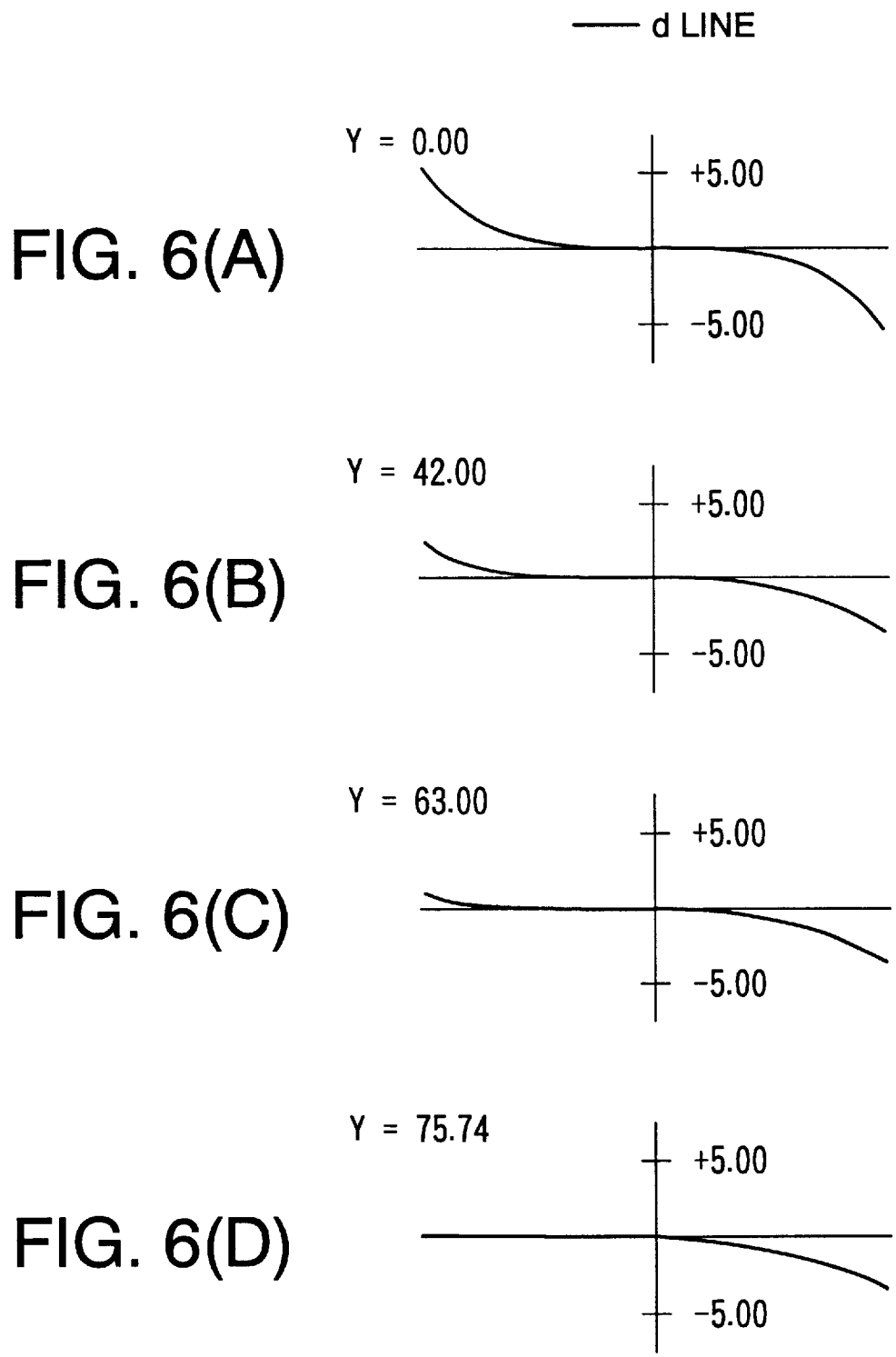
FIGS. 6(A) through 6(D) are graphs showing meridional transverse aberrations of the soft focus lens according to the second embodiment.

FIG. 4 shows an arrangement of the soft focus lens of the second embodiment. The numerical construction of the lens of this embodiment is described in TABLE 2. FIG. 5 shows the third order aberrations and FIG. 6 shows the meridional transverse aberrations according to the second embodiment when the focal length is scaled to 100 mm.

TABLE 2

| f = 100.04 | fB = 128.10 | fF = −123.660 |
| FNo. = 1:2.9 | ω = 37.9° | SAU = −24.5 |

| Surface number | r | d | n | ν |
|---|---|---|---|---|
| 1 | 1293.910 | 10.43 | 1.69680 | 55.5 |
| 2 | −1752.260 | 0.35 | | |
| 3 | 231.480 | 8.34 | 1.58913 | 61.2 |
| 4 | 49.860 | 75.68 | | |
| 5 | 82.910 | 35.13 | 1.74230 | 49.3 |
| 6 | −157.810 | 17.37 | | |
| 7 | −85.220 | 6.95 | 1.76180 | 27.1 |
| 8 | 121.140 | 3.17 | | |
| 9 | 658.350 | 12.00 | 1.69680 | 55.5 |
| 10 | −61.860 | | | |

Third Embodiment

Figure 7:
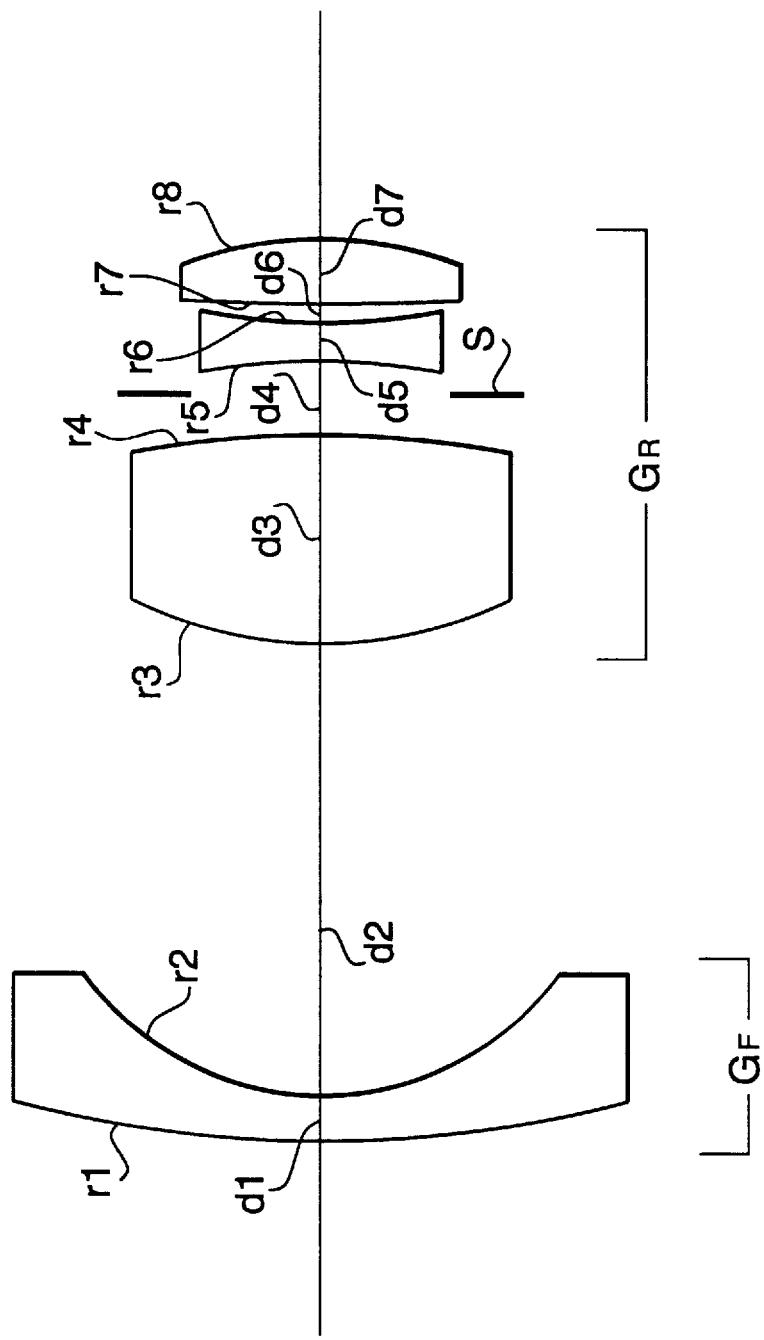
FIG. 7 is a lens diagram of a soft focus lens according to a third embodiment.

FIG. 7 shows an arrangement of the soft focus lens of the third embodiment. The numerical construction of the lens of this embodiment is described in TABLE 3. FIG. 8 shows the third order aberrations and FIG. 9 shows the meridional transverse aberrations according to the third embodiment.

TABLE 3

| f = 100.00 | fB = 134.97 | fF = −104.565 |
| FNo. = 1:3.6 | ω = 34.2° | SAU = −18.9 |

| Surface number | r | d | n | ν |
|---|---|---|---|---|
| 1 | 194.200 | 7.00 | 1.58913 | 61.2 |
| 2 | 46.142 | 70.00 | | |
| 3 | 69.557 | 32.00 | 1.74230 | 49.3 |
| 4 | −132.395 | 12.00 | | |
| 5 | −71.495 | 5.83 | 1.76180 | 27.1 |
| 6 | 101.630 | 2.66 | | |
| 7 | 552.323 | 10.00 | 1.69680 | 55.5 |
| 8 | −60.996 | | | |

Fourth Embodiment

Figure 10:
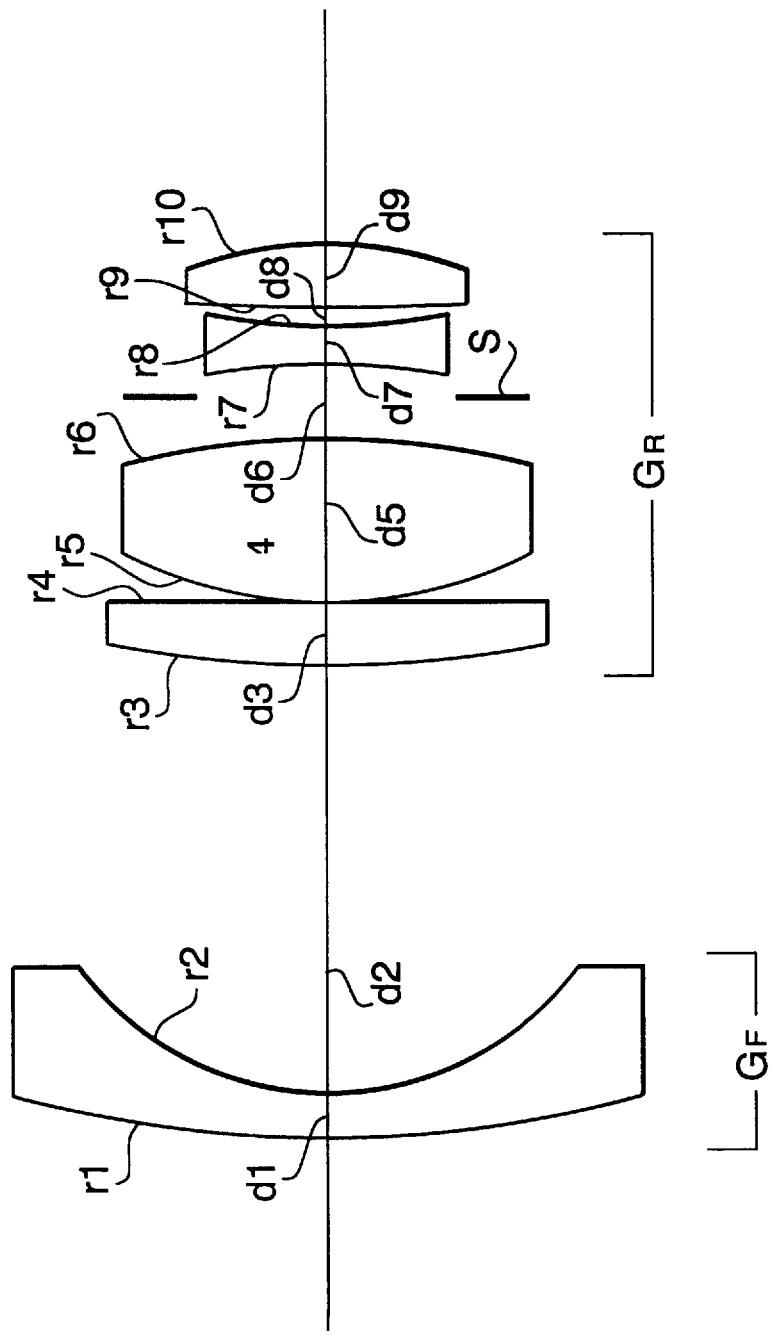
FIG. 10 is a lens diagram of a soft focus lens according to a fourth embodiment.

FIG. 10 shows an arrangement of the soft focus lens of the fourth embodiment. The numerical construction of the lens of this embodiment is described in TABLE 4. FIG. 11 shows the third order aberrations and FIG. 12 shows the meridional transverse aberrations according to the fourth embodiment.

TABLE 4

| f = 100.00 | fB = 136.71 | fF = −104.570 |
| FNo. = 1:3.6 | ω = 34.0° | SAU = −12.6 |

| Surface number | r | d | n | ν |
|---|---|---|---|---|
| 1 | 194.200 | 7.00 | 1.61800 | 63.4 |
| 2 | 47.821 | 66.00 | | |
| 3 | 200.000 | 10.00 | 1.48749 | 70.2 |
| 4 | ∞ | 0.00 | | |
| 5 | 70.000 | 25.00 | 1.60311 | 60.7 |
| 6 | −115.347 | 12.00 | | |
| 7 | −71.495 | 5.83 | 1.72047 | 34.7 |
| 8 | 85.261 | 2.66 | | |
| 9 | 552.323 | 10.00 | 1.69680 | 55.5 |
| 10 | −59.099 | | | |

The following table 5 shows the relationships between the conditions (1) though (5) for each of the embodiments. All of the embodiments satisfy the five conditions and thus provide a predetermined spherical aberration to obtain the soft focus effect while reducing aberrations other than the spherical aberration within the wide view angle. As such, each of the soft focus lenses of the embodiments provides a good performance for forming a soft focus image within the wide view angle that is sufficient for the landscape photograph.

TABLE 5

| | | Embodiments | | | |
| Condition | | First | Second | Third | Fourth |
|---|---|---|---|---|---|
| (1) | SAU/f | −0.22 | −0.24 | −0.19 | −0.13 |
| (2),(3) | f/fF | −0.864 | −0.809 | −0.956 | −0.956 |
| (4) | rm/f | 0.84 | 0.83 | 0.70 | 0.70 |
| (5) | FNO. | 1:2.9 | 1:2.9 | 1:3.6 | 1:3.6 |
| (6) | ω | 37.9° | 37.9° | 34.2° | 34.0° |

The present disclosure relates to subject matter contained in Japanese Patent Application No. HEI 07-351074, filed on Dec. 25, 1995, which is expressly incorporated herein by reference in its entirety.

What is claimed is:

1. A soft focus lens comprising:

a front lens group having a negative power;

a rear lens group having positive power; and a diaphragm located within said rear lens group, wherein said front and rear lens groups are arranged in this order from an object side and said soft focus lens satisfies the following conditions;

$$SAU/f < -0.10 \quad (1)$$

$$f/fF < -0.5 \quad (2)$$

where

SAU is spherical aberration at full open aperture, f is focal length of the whole lens system, and fF is focal length of said front lens group.

2. The soft focus lens according to claim 1, further satisfying the following condition;

$$-2.0 < f/fF \quad (3).$$

3. The soft focus lens according to claim 1, wherein said front lens group comprises at least a negative meniscus lens of which a convex surface is directed to an object side.

4. The soft focus lens according to claim 1, wherein said rear lens group comprises a positive lens at the object side of said diaphragm, a convex surface of said positive lens is directed to said object side, and wherein the following condition is satisfied;

$$0.50 < rm/f < 10.00 \quad (4)$$

where rm is a radius of curvature of a convex surface directed to the object side that has the largest positive power in the object side of the diaphragm in the rear lens group.

5. A soft focus lens satisfying the following conditions;

$$SAU/f < -0.10 \quad (1)$$

$$FNO. < -4 \quad (5)$$

$$\omega > 30° \quad (6)$$

where

SAU is spherical aberration at full open aperture, f is focal length of said soft focus lens, FNO. is f-number at full open aperture, and ω is a half angle of view.

* * * * *

UNITED STATES PATENT AND TRADEMARK OFFICE
CERTIFICATE OF CORRECTION

PATENT NO. : 5,822,132
DATED : October 13, 1998
INVENTOR(S) : Jun HIRAKAWA

It is certified that error appears in the above-identified patent and that said Letters Patent is hereby corrected as shown below:

On the cover page of the printed patent, paragraph [73] Assignee, line 1, "Asahi Kogaku Kabushiki Kaisha" should be changed to ---Asahi Kogaku Kogyo Kabushiki Kaisha---.

At column 6, lines 25 and 26 (claim 1, lines 5 and 6) of the printed patent, delete "in this order".

At column 6, line 33 (claim 1, line 11) of the printed patent, change "is" (both occurrences) to ---is a---.

At column 6, line 34 (claim 1, line 12) of the printed patent, change "is" to ---is a---.

At column 6, line 44 (claim 4, line 2) of the printed patent, change "at" to ---on---.

At column 6, line 45 (claim 4, line 3) of the printed patent, change "is" to ---being---.

UNITED STATES PATENT AND TRADEMARK OFFICE
CERTIFICATE OF CORRECTION

PATENT NO. : 5,822,132
DATED : October 13, 1998
INVENTOR(S) : Jun HIRAKAWA

It is certified that error appears in the above-identified patent and that said Letters Patent is hereby corrected as shown below:

At column 6, line 53 (claim 4, line 9) of the printed patent, change "in" (first occurrence) to ---on---.

Signed and Sealed this

Thirty-first Day of August, 1999

Attest:

Q. TODD DICKINSON

*Attesting Officer*   Acting Commissioner of Patents and Trademarks